(No Model.)
W. A. HULL.
FAUCET.
No. 583,906. Patented June 8, 1897.
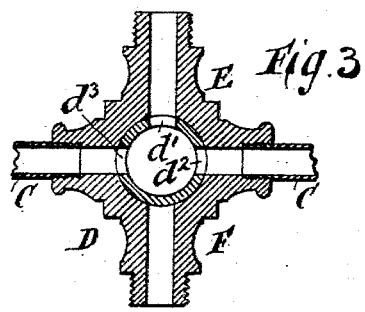
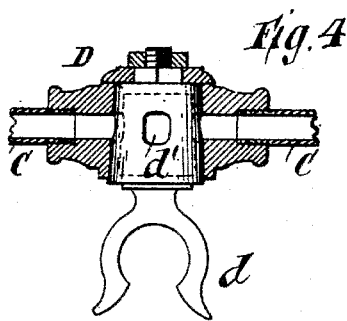
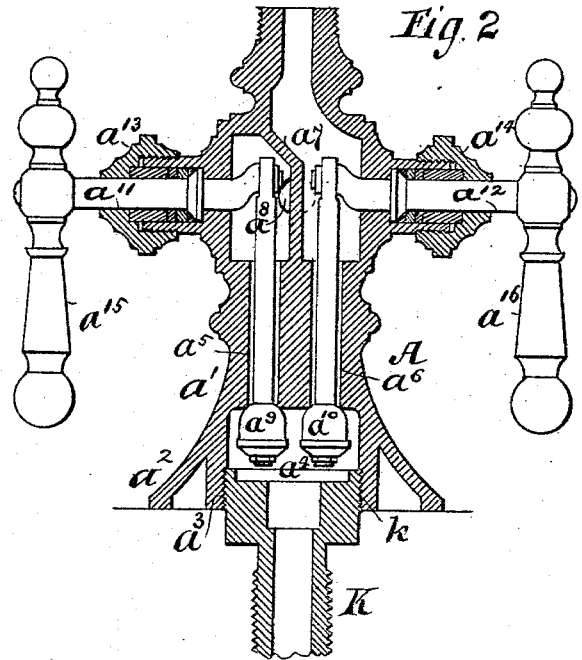
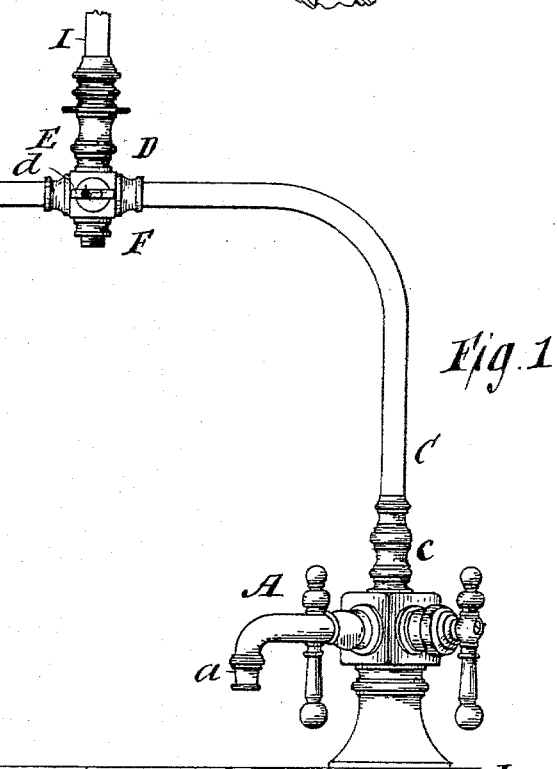
Witnesses
Geo. Wadman
Pierson L. Hells
Inventor
Wolcott A. Hull
By his attorney
Edwin H. Brown

UNITED STATES PATENT OFFICE.

WOLCOTT A. HULL, OF NEW YORK, N. Y.

FAUCET.

SPECIFICATION forming part of Letters Patent No. 583,906, dated June 8, 1897.

Application filed May 27, 1895. Serial No. 550,896. (No model.)

*To all whom it may concern:*

Be it known that I, WOLCOTT A. HULL, of New York, in the county and State of New York, have invented a certain new and useful Improvement in Faucets, of which the following is a specification.

My improvement relates particularly to faucets such as are used in connection with the water systems of houses and other buildings. By the term "faucets" herein I wish to include all dispensing devices, whether technically termed "faucets," "cocks," or "bibs."

I will describe an article embodying my improvement, and then point out the novel features in the claims.

In the accompanying drawings, Figure 1 is a vertical section of the top slab of a washbasin, a number of faucets adjacent thereto, and a swivel-pipe comprised in my improvement. Fig. 2 is a central vertical section of one of the faucets, taken in the plane of shafts or rods for operating its valves. Fig. 3 represents a vertical section of another faucet comprised in my improvement. Fig. 4 is a horizontal section of the faucet illustrated in Fig. 3.

Similar letters of reference designate corresponding parts in all the figures.

It will be seen that in Fig. 1 there are two faucets A of similar construction. These are designed to control the flow of water to a washbasin B. Each of these faucets is intended to control the escape of water from either of two outlets. One of these outlets communicates with a nozzle $a$, extending over the washbasin. The other communicates with a pipe C, leading upwardly. The two pipes C extend to a faucet D, which is of the type known as a "three-way" faucet or cock, capable of controlling the passage of water from either or both of the pipes C into either one of two outlets E F, and also permitting the escape of water from both the pipes C to one of said outlets E F. Thus hot and cold water may be mixed together in any desired proportions or either alone may be allowed to escape.

The handle $d$ of the cock D is shown as made in bifurcate form, so as to serve as a rest or support for a spray-nozzle connected to one of the outlets E F by a flexible pipe.

With this general introductory description I will take up the details of the parts constituting my invention.

In Fig. 2 I have shown the internal construction of the faucets A. $a'$ designates the body of one of such faucets. At the base it is provided with an outward extension $a^2$, forming a support constructed to rest upon any suitable surface—as, for instance, the slab adjacent to a washbasin.

K designates a supply-pipe or a coupling for attachment to a supply-pipe. I will refer to it hereinafter simply as a "supply-pipe." At its upper end it is provided with an external screw-thread $k$. The base $a^2$ of the faucet is provided internally with a screw-thread $a^3$ of a size and shape suitable for engaging the screw-thread $k$.

In the lower part of the body of the faucet A is a valve-chamber $a^4$. From the valve-chamber extend upwardly two waterways $a^5$ $a^6$.

The waterway $a^5$ is closed by a partition or diaphragm $a^7$ in the direction of the length of the body of the faucet and communicates with an outlet $a^8$, which is arranged transversely to the length of the body of the faucet and permits of the passage of water to the nozzle $a$. (Shown in Fig. 1.)

The waterway $a^6$ extends lengthwise through the body of the faucet and communicates with one of the pipes C, the latter being connected to the body of the faucet in any suitable manner—as, for instance, by an ordinary union-coupling $c$.

Within the valve-chamber $a^4$ are arranged valves $a^9$ $a^{10}$, which coact with the lower ends of the waterways $a^5$ $a^6$ at the points where they communicate with the valve-chamber. These valves are moved lengthwise of the body of the faucet to and away from the ends of the said waterways to close and open the latter. They have shanks or stems that are pivotally connected at the ends with cranked shafts $a^{11}$ $a^{12}$, which are supported in bearings, here shown as made in the form of stuffing-boxes $a^{13}$ $a^{14}$, at the sides of the body of the faucet. The cranks of these shafts are at their inner ends, and hence are located in the waterways $a^5$ $a^6$. The outer ends of the shafts are provided with handles $a^{15}$ $a^{16}$, by which they may be rotated. It will be seen that each of the faucets A has two waterways which communicate with a valve-chamber common to both and have differently-arranged outlets, one extending transversely and the other longitudinally through the faucet-body. It will of course be understood that water may be discharged from each of the faucets A out of either or both of two outlets. Hot water may be discharged from one faucet and cold from the other.

As to the faucet D, already described as located intermediately of the two pipes C and of the outlets E F, I need only add to the statement that it is a three-way faucet or cock and that its barrel has three ports $d'$ $d^2$ $d^3$. Obviously, when this cock is turned so that two of its ports will be in line with the outlet ends of the two pipes C water will pass from both of these pipes into the barrel of this faucet. At this time the third port will be in line with the outlet E and swivel-pipe I. Hence water will pass from both these outlets. Obviously, by completely reversing the barrel of this faucet D water may be discharged from both of the pipes C to the outlet F. By turning the barrel of the faucet D so that its ports will be out of line with the pipes C no water will escape. It need hardly be added that water may be permitted to escape from either of the pipes C to either of the outlets by suitably adjusting the barrel of this faucet.

What I claim as my invention, and desire to secure by Letters Patent, is—

1. In a faucet, the combination of a body having a waterway passing longitudinally through it, a second waterway extending longitudinally within said body, a transverse partition closing the latter within said body, an outlet-opening for the second waterway, extending transversely to the length of the body, a common inlet or supply chamber for the two waterways, and two valves in said body for the said waterways, substantially as specified.

2. The combination with two faucets, each having a waterway extending longitudinally within the body, of two pipes extending from the waterways of the two faucets, two immovable outlets for the two pipes, and a valve intermediate the two pipes and the two outlets, for controlling the flow from the two pipes to either one of the two outlets, substantially as specified.

3. The combination with two faucets, each having a waterway whose outlet end extends longitudinally through the body, and another waterway whose outlet end extends transversely through the body, each having two valves for controlling its two waterways, of two pipes extending from the two waterways whose outlet ends pass longitudinally through the bodies of the faucets, and an outlet common to the said two pipes, substantially as specified.

4. The combination with two faucets, each having a waterway whose outlet end extends longitudinally through the body, and another waterway whose outlet end extends transversely through the body, and each having two valves for controlling its two waterways, of two pipes extending from the two waterways whose outlet ends pass longitudinally through the bodies of the faucets, a valve intermediate the two pipes, and two outlets adjacent the last-mentioned valve, substantially as specified.

5. The combination with two faucets, each having a waterway whose outlet extends longitudinally through the body, and another waterway whose outlet extends transversely through the body, and each having two valves for controlling its two waterways, of two pipes extending from the two waterways whose outlet ends pass longitudinally through the bodies of the faucets, a valve intermediate the two pipes, and two outlets adjacent the last-mentioned valve; the last said valve being constructed to form a support for a discharge device flexibly connected with one of the outlets, substantially as specified.

6. The combination with two faucets each having a waterway whose outlet end extends longitudinally through the body, and another waterway whose outlet end extends transversely through the body, and each having two valves for controlling its two waterways, of two pipes extending from the two waterways whose outlet ends pass longitudinally through the bodies of the faucets, a valve intermediate the two pipes, two outlets adjacent the last-mentioned valve, and a pipe having a swiveling connection with one of these outlets, substantially as specified.

In testimony whereof I have signed my name to this specification in the presence of two subscribing witnesses.

WOLCOTT A. HULL.

Witnesses:
WILLIAM A. POLLOCK,
WALTER A. PAULING.